United States Patent
Liu et al.

(10) Patent No.: US 9,740,739 B2
(45) Date of Patent: Aug. 22, 2017

(54) VISIONARY QUERY PROCESSING IN HADOOP UTILIZING OPPORTUNISTIC VIEWS

(71) Applicant: NEC Laboratories America, Inc., Princeton, NJ (US)

(72) Inventors: Ziyang Liu, Santa Clara, CA (US); Vahit Hacigumus, San Jose, CA (US)

(73) Assignee: NEC Corporation, Tokyo (JP)

( * ) Notice: Subject to any disclaimer, the term of this patent is extended or adjusted under 35 U.S.C. 154(b) by 268 days.

(21) Appl. No.: 14/506,625

(22) Filed: Oct. 4, 2014

(65) Prior Publication Data
US 2015/0149434 A1 May 28, 2015

Related U.S. Application Data

(60) Provisional application No. 61/909,364, filed on Nov. 26, 2013.

(51) Int. Cl.
*G06F 17/30* (2006.01)
(52) U.S. Cl.
CPC .............................. *G06F 17/30466* (2013.01)
(58) Field of Classification Search
CPC ................................................ G06F 17/30463
See application file for complete search history.

(56) References Cited

U.S. PATENT DOCUMENTS

| | | | | |
|---|---|---|---|---|
| 2009/0281987 | A1* | 11/2009 | Krishnamoorthy | G06F 17/30463 |
| 2009/0319486 | A1* | 12/2009 | Surlaker | G06F 17/30356 |
| 2010/0030741 | A1* | 2/2010 | Johnson | G06F 17/30457 707/718 |
| 2010/0250518 | A1* | 9/2010 | Bruno | G06F 17/30386 707/718 |

OTHER PUBLICATIONS

Anisoara Nica, Analyzing Query Optimization Process: Portraits of Join Enumeration Algorithms, Jul. 2, 2012, 2012 IEEE 28th International Conference on Data Engineering, pp. 1301-1304.*
Sean Chester, Computing optimal k-regret minimizing sets with top-k depth contours, Jul. 26, 2012, ACM, pp. 1-10.*

* cited by examiner

*Primary Examiner* — Mohammad S Rostami
(74) *Attorney, Agent, or Firm* — Joseph Kolodka

(57) ABSTRACT

Systems and methods are disclosed for query processing in a big data analytics platform by enumerating plans for a current query using a processor; building a dominance graph for the current query; for each plan, determining a regret value and a score for the plan based on the regret value and cost; and selecting query plans in an online fashion for query processing in big data analytics platforms where intermediate results are materialized and can be reused later.

13 Claims, 2 Drawing Sheets

VISIONARY QUERY PROCESSING IN HADOOP UTILIZING OPPORTUNISTIC VIEWS

This application claims priority to Provisional Application 61/909,364 filed Nov. 26, 2013, the content of which is incorporated by reference.

BACKGROUND

Big data analytics is receiving significant interest from research and engineering organizations. The efforts from big data practitioners have helped advance the state-of-the-art in recent years. MapReduce (MR) (and Hadoop as the open source implementation of MR) has risen as the platform of choice for many of those practitioners as it offers scalability to large data sets, easy incorporation of new data sources, and the ability to query without lengthy schema definition processes. These approaches usually provide SQL or SQL-like (e.g., Hive) query APIs for easier programmability.

An evolutionary nature has been observed in how data analysts use analytical queries on big data. For example, an analyst wishes to identify top-1000 wine lovers in Northern California, who could be a good target customer set for a promotion campaign. Obviously, many aspects in this request are vague, e.g., how to define a top customer; which data sets are the most appropriate to do the analysis, etc. Therefore, the analyst typically starts with a best-effort query and issues a sequence of refined queries before getting the satisfactory result. This will be increasingly the case with the lower and lower cost of querying big data, which enables more people, including non-database-experts, to perform analytics on big data. Naturally, a data analytics system that selectively reuses the results and intermediate results produced by previous queries, referred to as opportunistic views, could deliver a much greater performance for such workloads. In Hadoop, each MR job involves the materialization of intermediate results for the purpose of failure recovery. A typical Hive query spawns a multi-stage job that will involve several of such materializations. These materialized results are the artifacts of query execution and generated automatically as a by-product of query processing, which is the reason they are called opportunistic views.

SUMMARY

Systems and methods are disclosed for query processing in a big data analytics platform by enumerating plans for a current query using a processor; building a dominance graph for the current query; for each plan, determining a regret value and a score for the plan based on the regret value and cost; and selecting query plans in an online fashion for query processing in big data analytics platforms where intermediate results are materialized and can be reused later.

In one implementation, a method named ManagedRisk, which, for each query, takes into account both the current cost of a query plan as well as whether a plan will produce useful opportunistic views for future query. Since it does not know or make assumptions on what queries it will receive in future, it gauges the usefulness of a query via previous queries. ManagedRisk has a competitive ratio of $(2^m-m-1)$ for a special case of the VQP problem where all queries are join-only, and a competitive ratio of $(2^m-m-1)\ln N$ for the general VQP problem where queries are SPJGA, where m is the maximum number of joins in a query, and N is the number of queries.

Advantages of the system may include one or more of the following. By carefully designing the way of computing the regret and the score of a query plan, we are able to develop a competitive online algorithm that processes each query without knowing future queries, and has a worst case performance guarantee.

DESCRIPTION

Figure 1:
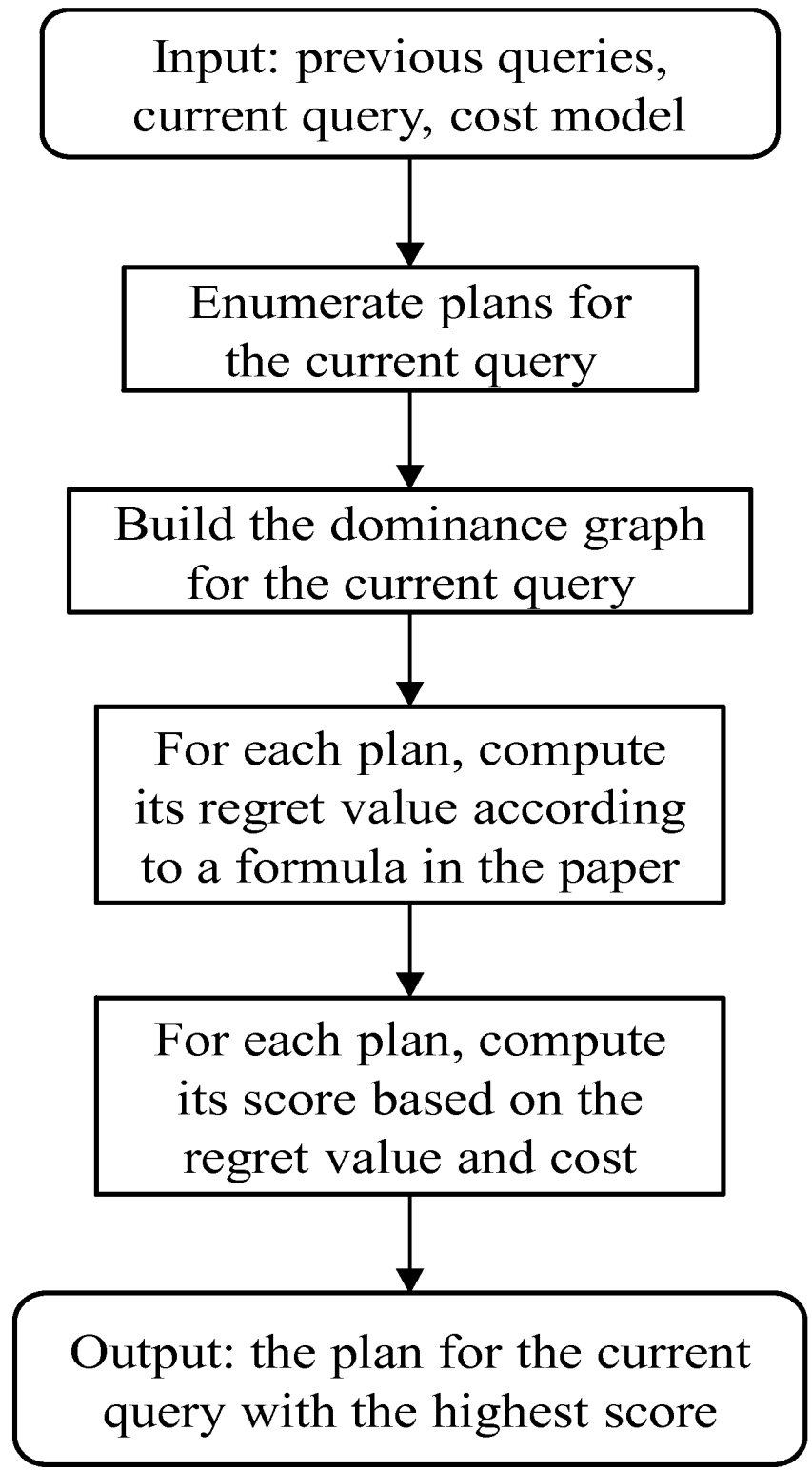
FIG. 1 shows an exemplary process for performing Visionary Query Processing.
Figure 2:
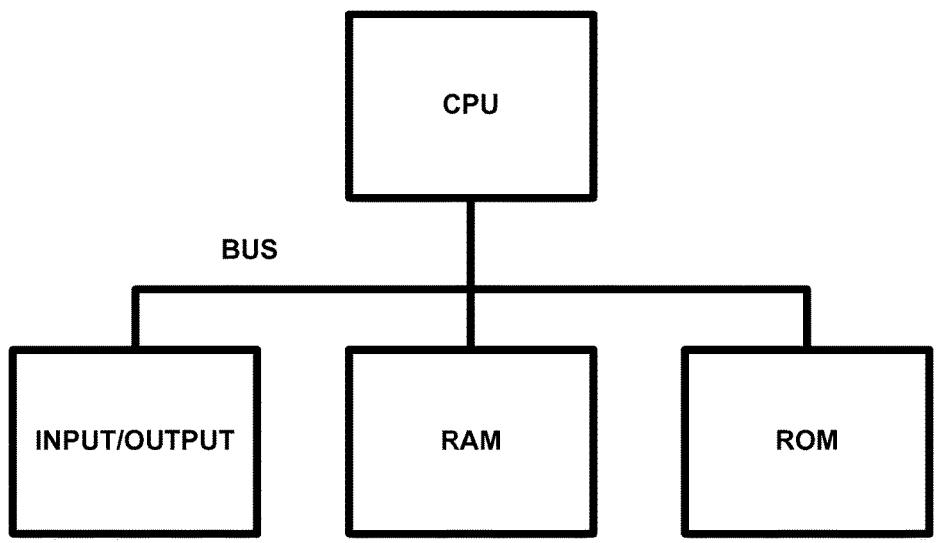
FIG. 2 shows an exemplary system for performing Visionary Query Processing.

The present system performs optimization of online query processing in big data analytics platforms such as Hadoop. Hadoop and similar systems usually materialize intermediate results (referred to as "opportunistic views") of a query plan for fault tolerance, which can be reused to speed up future queries. Thus to minimize the total cost of a sequence of queries, each query should not simply use the currently cheapest, but should consider whether a plan will produce useful opportunistic views that may benefit future queries. We name this problem Visionary Query Processing.

The system chooses an execution plan for each query, in a setup where the result and intermediate results (opportunistic views) of the plan can be reused for future queries. Specifically, given a schema, a cost model, and an online workload of SPJGA queries, we aim to find a plan for each query such that the total cost (which can be response time, dollar cost, etc.) is minimized for the whole workload. The challenge of the problem is that, if we choose plans in a greedy manner, i.e., for each query in the sequence, choose the plan with the minimum cost, it may ultimately lead to an unbounded cost compared with the ideal solution. In addition to the cost of a query plan, we should also consider whether a plan might produce opportunistic views that can potentially benefit future queries. However, queries are received in an online fashion, which means that at any point we do not know how many queries will be received in the future and what they are, and to make the solution widely applicable we should not make assumptions on that. The following example shows the challenge. C(P) is the cost of plan P, and c(s) is the cost of subexpression s.

Consider a sequence of join-only queries $Q_1 = A \triangleright \triangleleft B \triangleright \triangleleft C_1$, $Q_2 = A \triangleright \triangleleft B \triangleright \triangleleft C_2$, ..., and suppose there are two possible plans for each query $Q_x$: $P_{x1}=(AB)C_x$, which first joins A and B, and $P_{x2}=A(BC_x)$, which first joins B and $C_x$. $c(A \triangleright \triangleleft B)=100$, $c((A \triangleright \triangleleft B) \triangleright \triangleleft C_x)=\in$ where $\in$ is a negligibly small positive number, and $C(P_{x2})=10$. If there are 10 queries or less in the sequence, the best solution is to use plan $P_{x2}$ for all queries; the total cost is 10n where n is the number of queries. Choosing plan $P_{x1}$ for any $Q_x$ will incur a cost of $100+\in$, which exceeds 10n. On the other hand, if there are 11 or more queries, ideally we should use plan $P_{11}$ for the first query $Q_1$, which enables opportunistic view $A \triangleright \triangleleft B$ to be reused by other queries, so that other queries can all use plan $P_{x1}$ with a cost of $\in$. In this way, the total cost is $100+n\in$, which is lower than 10n.

If we use a greedy approach that chooses the plan with the lowest cost for the current query, we will always choose $P_{x2}$ for every query $Q_x$. Since n can be arbitrarily large and c can be arbitrarily small, the total cost of such a greedy method is unbounded compared to the optimal cost.

We focus on selecting the query execution plans that would produce the most useful opportunistic views for the whole workload. It is important to note that the plan selection problem in this context has similarities and also significant differences the view/index selection and maintenance related problems.

FIG. 1 shows an exemplary process for performing Visionary Query Processing. The process uses as inputs previous queries, current query, and a cost model. The process then enumerates plans for the current query and builds a dominance graph for the current query. For each plan, the process determines a regret value, and for each plan, determine a score based on the regret value and cost. The process then generates as output a plan for the current query with the highest score. By carefully designing the way of computing the regret and the score of a query plan, we are able to develop a competitive online algorithm that processes each query without knowing future queries, and has a worst case performance guarantee.

A method named ManagedRisk, which, for each query, takes into account both the current cost of a query plan as well as whether a plan will produce useful opportunistic views for future query. Since it does not know or make assumptions on what queries it will receive in future, it gauges the usefulness of a query via previous queries. ManagedRisk has a competitive ratio of $(2^m-m-1)$ for a special case of the VQP problem where all queries are join-only, and a competitive ratio of $(2^m-m-1)\ln N$ for the general VQP problem where queries are SPJGA, where m is the maximum number of joins in a query, and N is the number of queries.

We use capital letters A, B, etc., to denote tables, and small letters a, b, etc., to denote attributes. We do not discuss projections or group-bys, since they can be handled in the same way as predicates. For ease of illustration we assume that all joins are natural joins. Other join types can also be supported without changing the method. Thus a query can be represented by a set of relations accompanied by predicates. An example is $(A_{a<10}, B, C)$ which represents a query that joins relations A, B, C with predicate A.a<10.

We use P to denote a query plan, and C(P) to denote the cost of P. Each plan contains multiple subexpressions. A subexpression has one of the following two types: (1) join of two tables or views; (2) applying a predicate on a table or view.

Each subexpression produces an intermediate result (or simply result), also called opportunistic view (or simply view). These terms are used interchangeably. Formally, the notation for subexpressions and views are as follows. For simplicity, the following rules are for join-only queries, and general SPJGA queries are discussed later. Notations are summarized as follows:

```
TABLE ← A,B,C, ...
VIEW ← TABLE TABLE
VIEW ← TABLE VIEW
SUBEX ← TABLE TABLE
SUBEX ← TABLE (VIEW)
SUBEX ← (VIEW) TABLE
SUBEX ← (VIEW) (VIEW)
```

Note that this notation can be ambiguous, e.g., AB can represent both a subexpression and a view. However, this is not a problem when the context is clear, and for clarity, we do not attempt to use more complicated notations.

For example, AB denotes a subexpression that joins tables A and B (or the view it produces); A(BC) denotes a subexpression that joins table A with the view of B ▷◁ C; ABC denotes a view of A ▷◁ B ▷◁ C.

The cost of a subexpression s is denoted by c(s). For example, for a query (A,B,C) (i.e., natural join of three relations A, B, C with no predicates or projections), one possible plan is P=A ▷◁ (B ▷◁ C), which first joins B with C, and then joins the result with A. There are two subexpressions in this plan: BC and A(BC). Thus C(P)=c(BC)+c(A(BC)).

We say that an method uses a subexpression s or produces the result/view of a subexpression s in query Q, if the plan chosen by the method for query Q contains s.

As a starting point, we first study a special case of the VQP problem, where each query is join-only with no predicates, projections or group-bys. We first present two straightforward methods, method Greedy and method Normalize, and show that they are not competitive even if each query involves at most two joins. Then we present method ManagedRisk, and prove its competitive ratio of $2^m-m+1$ where m is the largest number of joins involved in a query. At a high level, for each query, all three methods enumerate all possible plans, but use different criteria to decide which plan to choose.

For each query, a conventional baseline method called method Greedy can be used that chooses the plan with the lowest cost. Method Greedy is non-competitive even if each query involves at most two joins. The reason for its non-competitiveness is that, method Greedy processes each query in a selfish manner, and is not willing to take any risk. In particular, in Example 1, "risk" refers to using plan $P_{x1}$, since it is more expensive than $P_{x2}$. Doing so "sacrifices" the efficiency of the current query, and is beneficial only if there are future queries that reuse opportunistic view AB. At the first glance, this seems what an method should do, since it does not know the future queries (unless it assumes that future queries will be similar as past queries, but we do not make such an assumption), and in the worst case, no future query will reuse AB. However, we will show in Section 3.3 when we introduce method ManagedRisk, that certain risk should be taken in order to obtain a competitive method.

Another conventional method Normalize can be used which attempts to solve the problem of method Greedy with the following idea: for each query, it not only considers which plan has the lowest cost, but also considers how many times the subexpressions in a plan have occurred before. It favors a query plan if it contains subexpressions that have occurred many times in previous queries.

Method Normalize chooses query plans based on how many previous queries can potentially benefit from the result of a subexpression, in addition to the cost of the query plan. It normalizes the cost of a subexpression based on the number of previous potential beneficiaries. To explain it we introduce the following definition.

Subexpression Containment is discussed next. A query is said to contain a subexpression s, if s occurs in one of the possible plans for the query. We use s◁Q to denote that subexpression s is contained in query Q. For example, a query (A, B, C, D) may contain subexpressions AB, BC, CD, AC, (AB)C, A(BCD), (AB)(CD), etc., depending on which two tables can be joined.

Note the difference between contained and used. A subexpression is contained in a query if it belongs to one of the possible plans; a subexpression is used in a query if it belongs to the plan selected by a certain method.

If $s \triangleright IQ$, then if the result of s is available when Q is processed, and if we decide to choose a plan of Q that includes s, then this plan can reuse the result of s, and doest not need to pay for the cost of s, c(s). Method Normalize favors a query plan if it includes a subexpression that is contained in many previous queries. Specifically, if a subexpression s is contained in k previous queries (including the current query), its normalized cost is c(s)/k. The normalized cost of a plan is the total normalized cost of all subexpressions in the plan, and method Normalize chooses the plan with the lowest normalized cost.

For the query sequence in Example 1, method Normalize uses plan $P_{x2}$ for the first 10 queries. When it processes the 11th query, the normalized cost of subexpression AB is 100/11 since it is contained in all 11 queries. Therefore, the normalized cost of plan $P_{11,1}$ is $100/11+\in$, which is smaller than the normalized cost of plan $P_{11,2}$ (10). Thus method Normalize uses plan $P_{11,1}$, which enables view AB to be reused by future queries, and avoids having an unbounded total cost, as method Greedy does.

Although Normalize works better than Greedy for this particular example, it is still non-competitive even if each query involves at most two joins.

Consider a sequence of queries $(A,B,C_1),(A,B,C_2), \ldots, (A,B,C_n)$, and suppose that there are two possible plans for each query $Q_x$: $P_{x1}=(AB)C_x$, which first joins A and B, and $P_{x2}=A(BC_x)$, which first joins B and $C_x$. c(AB)=n. For $1 \le x \le n-1$, $C(P_{x2})=\in$, and $c((AB)C_x)=\in$. For the last query, $C(P_{n2})=1+2\in$, and $c((AB)C_n)=\in$.

For this query sequence, Normalize will choose plan $P_{x2}$ for the first n−1 queries, incurring a cost of $(n-1)\in$. For the last query, the normalized cost of subexpression AB is 1 since it is contained in all n queries. Thus $C(P_{n1})=1+\in<C(P_{n2})=1+2\in$, and Normalize chooses plan $P_{n1}$. The total cost of Normalize is $n+n\in$. On the other hand, an optimal method would choose plan $P_{x2}$ for all queries for a total cost of $1+(n+1)\in$. Thus Normalize has an unbounded cost compared to the optimal solution.

As we can see, Normalize takes a big risk on the last query by using plan $(AB)C_n$, for which it gets no reward since it is the last query. Next we present method ManagedRisk that addresses the problems in both methods discussed so far.

It can be seen from the two methods previously discussed that we need to take some risk, but the risk should somehow be controlled to avoid the situation in Example 3.2. The high level idea of method ManagedRisk is that it only takes a risk if, in case it makes a wrong decision, the damage can be "matched" by part of the cost of the optimal solution, which prevents the cost of the method to go unbounded. We introduce the concept of regret to capture this idea. and now we introduce our method, Method ManagedRisk, for the special case of the VQP problem (VQP-SP). The VQP problem addresses the situation where each query in the sequence is an SPJGA query. For simplicity we only discuss predicates. Projections and group-bys can be handled in the same way as predicates, since they essentially are the same problem: they all impose a partial order on the opportunistic views, such that a view with a predicate, projection and/or group-by can be reused by a query with the same or a stronger predicate, projection and/or group-by, but not weaker. More details on the VQP problem are discussed in depth below.

Regret for VQP-SP is detailed next. Let $Q_1, Q_2, \ldots$ be a sequence of join-only queries, and let $P_i$ denote the plan selected for $Q_i$. For each query $Q_i$ and each subexpression $s \triangleright Q_i$, the regret of s wrt $Q_i$, denoted by $rg_i(s)$ or $rg_{Q_i}(s)$, is recursively defined as: if the result of s is not produced in any $P_j (1 \le j < i)$, $$rg_i(s) = \sum_{Q_j | j<i, s \triangleleft Q_j} \max\left\{C(P_j) - \sum_{s' \in P_j} rg_j(s'), 0\right\} \quad (1)$$

If the result of s is available for reuse when $Q_i$ is processed, i.e., it is produced in a query $Q_j(1 \le j<i)$, $rg_i(s)=0$.

Intuitively, $rg_i(s)$ roughly represents the consequence of the fact that the result of s is not available when Q is processed, i.e., Q needs to pay a cost of c(s) if we wish to use s in Q's plan. If $rg_i(s)$ is large, we are motivated to use a plan for Q that produces the result of s, because even if this is a bad decision, its damage can be "matched" by $rg_i(s)$. Note that the total regret of subexpressions used in each $P_j$ (i.e., $rg_j(s')$ in Eq. (1)) are subtracted from $rg_i(s)$. This is because $rg_j(s')$ has already influenced the choice of $P_j$ for query $Q_j$ (and hence matches the damage if it is a bad choice), and it should not make another impact on choosing a plan for $Q_i$.

There is a similar notion of regret (also called opportunity loss) in decision theory, which is defined as the additional payoff if a different action is chosen. Although the idea is somewhat similar, there are some key differences. First, decision theory aims to make a choice (such as determining the inventory level of a product) that minimizes the future regret if something goes wrong in future; while in our case, we do not analyze what can possibly happen in the future (because we don't know or make assumptions on how many queries we will receive in the future, and what they are). Instead, regret is computed from previous queries. Second, regret in decision theory is simply the difference in payoff, whereas in our problem the "difference in payoff" cannot be easily computed. For example, what would be the cost difference if, when we processed a query Q in the sequence, an intermediate result had been available? It depends on many factors such as what are the other possible plans of Q, what are the other intermediate results that can be reused by Q, etc. Using a different plan for one query may affect the "difference in payoff" of many other queries. Third, in our problem, regrets have cascading effects, e.g., the regret of a subexpression may influence our choice on a plan for one query, which in turn influence the regret of other subexpressions, as well as the choice on plans for future queries.

Method ManagedRisk works as follows. For each query $Q_i$ in the sequence it enumerates the plans of $Q_i$ similar as Greedy and Normalize. For each plan $P_{ij}$, it uses a scoring function $score(P_{ij})$ defined as $$score(P_{ij}) = \sum_{s \in P_{ij}} rg_i(s) - C(P_{ij}) \quad (2)$$

A plan that contains high-regret subexpressions and has a low cost gets a high score. ManagedRisk chooses the plan for $Q_i$ with the maximum score among all plans for $Q_i$.

Consider the query sequence in Example 1. For the first 10 queries, ManagedRisk uses plan $P_{x2}$, and pays a cost of 10 for each plan. We it processes the 11th query, we have $rg_{11}(AB)=100$, and the regrets of all other subexpressions are 0. Since $$rg_{11}(AB)-C((AB)C_{11})=-\in>C(A(BC_{11}))=-10,$$

method ManagedRisk chooses plan $P_{11,1}$ for this query. Note that even if the 11th query is the last query, which means using $P_{11,1}$ at this point is a bad choice, since $rg_{11}(AB)$ is large enough, it is able to "match" the "damage" caused by using $P_{11,1}$, which avoids the total cost of ManagedRisk being arbitrarily worse than the optimal cost. In this example the cost of ManagedRisk is no more than twice the optimal cost.

Now consider the query sequence in Example 3.2. For $1 \leq x \leq n-1$, ManagedRisk uses plan $P_{x2}$, incurring a cost of $(n-1)\epsilon$, and thus $rg_n(AB)=(n-1)\epsilon$. For the nth query, since the regrets of all other subexpression are 0, we have $$rg_n(AB) - C((AB)C_n) < -C(A(BC_n))$$

thus ManagedRisk will use $P_{n2}$. In this case, even though subexpression AB is contained in many queries seen before, ManagedRisk still doesn't use AB for the n th query, as the total cost of all previous queries that contain AB (i.e., $rg_n(AB)$) is too small and thus using AB is too risky. ManagedRisk finds the optimal plans for this query sequence.

Before analyzing the competitiveness of method ManagedRisk, we first prove that in order to get a competitive ratio better than O(N) (which is a trivial competitive ratio) where N is the number of queries in the sequence, the competitive ratio of an online method must be a function of # Join(S), which is the maximum number of joins involved in a query in sequence S. There does not exist an online method for VQP-SP with a competitive ratio better than O(N), N being the number of queries in the sequence, if the maximum number of joins involved in a query (#Join(S)) is unbounded.

TABLE 1

Summary of Symbols

| | |
|---|---|
| $(r_1, r_2, \ldots)$ | a query that joins source tables $r_1, r_2, \ldots$ |
| $Q < Q'$ | query Q is before Q' in the sequence |
| $Q \leq Q'$ | $Q = Q'$ or $Q < Q'$ |
| $cost(\cdot)$ | total cost of all query plans selected by ON/OFF |
| $P_{N/F}(Q)$ | plan selected by ON/OFF for query Q |
| $c(s)$ | cost of a subexpression s |
| $C(P)$ | cost of a plan P |
| $C_{N/F}(P)$ | cost or a plan P paid by ON/OFF |
| $C_{N/F}(Q)$ | $C_{N/F}(P_{N/F}(Q))$ |
| $un(P)$ | subexpressions in P whose results have not been produced |
| $rg_i(s)$ | regret of s wrt the ith query |
| $rg_Q(s)$ | regret of s wrt query Q |
| $rg_i(P)$ | regret of plan P wrt the ith query |
| $rg(P)$ | regret of plan P wrt the current query |
| $f_y(Q)$ | first late subexpression in Q used for the first time by ON in Q |
| $f_n(Q)$ | first late subexpression in Q used by OFF, but not used by ON in or before Q |
| $dif_s$ | the set of queries where OFF uses s but ON doesn't, and the result of s is not available for ON |
| $ldif_s$ | the last query in $dif_s$ |
| $fst_s$ | the first query where ON uses s |
| $dm_s$ | damage of subexpression s |

In the following proofs we use ON to denote method ManagedRisk, and OFF to denote an optimal offline method. $C_N(\cdot)$ represents the cost paid by method ON for a query or query plan, and $C_F(\cdot)$ is the cost paid by method OFF for a query or query plan. Let $P_N(Q)$ and $P_F(Q)$ denote the plan chosen by ON and OFF, respectively, for query Q. Let m=# Join (S). Since each query has at most m joins, each query has at most m+1 relations, and has at most m! plans, each with a different join order.

For two queries $Q_i$ and $Q_j$ in the sequence, let $Q_i \prec Q_j$ represent that $Q_i$ is before $Q_j$ in the sequence. Let $Q_i' Q_j$ represent that either $Q_i = Q_j$, or $Q_i \prec Q_j$.

To prove the competitive ratio, we first present Lemma 3.4, which proves that the total regret of all subexpressions is bounded. Given a query sequence S, the plans selected by ON and OFF satisfy $$\sum_{Q \in S} rg(P_N(Q)) \leq (2^m - m - 1) \cdot cost(OFF) \qquad (3)$$

where m is the maximum number of subexpressions in a query plan, and $rg(P_N(Q))$ is the total regret of all subexpressions in $P_N(Q)$ wrt Q.

Next we introduce the concept of late subexpressions, based on which we define the damage of incorrect choices made by ON. [Late Subexpression] Given a sequence of queries S and the query plans generated by ON and OFF, a subexpression s is late if the result of s is produced by OFF for the first time in query Q, and the result of s is either never produced by ON, or is produced by ON in a query Q', $Q \prec Q'$. For each late subexpression s, let $dif_s$ denote a set of queries such that for each $Q \in dif_s$, OFF uses s (i.e., $s \in P_F(Q)$) but ON does not use s in either Q or any query before Q in the sequence. Let $ldif_s$ denote the last query in $dif_s$. If ON uses s, let $fst_s$ be the first query where ON uses s.

In the following, we give a total order to all late subexpressions. The late subexpressions are ordered by decreasing order of the index of $ldif_s$, i.e., if $ldif_{s'} \prec ldif_{s''}$, then s' is before s in the total ordering, i.e., $s' < s$. Ties are broken arbitrarily. Given the query plans selected by ON and OFF, for each query Q in the sequence, let $L_y(Q)$ denote the set of late subexpressions contained in Q that are used by ON, and let $L_n(Q)$ denote the set of late subexpressions contained in S that are used by OFF but not by ON, i.e., $$L_y(Q) = \{s | s \triangleleft Q, s \text{ is late}, s \in P_N(Q)\}$$

$$L_n(Q) = \{s | s \triangleleft Q, s \text{ is late}, s \in P_F(Q), s \notin P_N(Q)\}$$

Also let $f_y(Q)$ and $f_n(Q)$ be the first late subexpression in $L_y(Q)$ and $L_n(Q)$, respectively, according to the total order defined previously.

Damage for VQP-SP is discussed next. Given a sequence of queries S and the query plans generated by ON and OFF, the damage of a subexpression s, denoted as dm is defined as:

If s is late, $dm_s = dm_s^{(1)} + dm_s^{(2)}$, where $$dm_s^{(1)} = \sum_{Q | Q \in dif_s, s = f_n(Q)} C_N(Q) - C_F(Q)$$

$$dm_s^{(2)} = \begin{cases} C_N(fst_s) - C_F(fst_s); & \text{if } fst_s \text{ exists} \\ & \text{and } s = f_y(fst_s) \text{ and } f_n(fst_s) = \emptyset \\ 0; & \text{otherwise} \end{cases}$$

otherwise, $dm_s = 0$.

Lemma 3.4 proves the validity of the definition of damage, i.e., the total damage of all subexpressions covers the cost difference between ON and OFF. Given a query sequence and the query plans generated by ON and OFF, the total damage of all subexpressions in the plans satisfies $$\sum_s dm_s \geq \text{cost(ON)} - \text{cost(OFF)} \qquad (4)$$

Finally we prove the competitive ratio for method ManagedRisk. The competitive ratio of method ManagedRisk is $(2^m - m + 1)$ for VQP-SP.

With the presence of predicates, we extend the notations of view and subexpression in as follows.

| OP    | ← | <,>,=          |
|-------|---|----------------|
| Attr  | ← | a,b,c,...      |
| Const | ← | Real Numbers   |
| Pred  | ← | Attr OP Const  |
| Pred  | ← | Pred & Pred    |
| Pred  | ← | Pred \| Pred   |
| View  | ← | Table $_{Pred}$ |
| View  | ← | View View      |
| SubEx | ← | View $_{Pred}$ |

For example, subexpression $ABC_p$ denotes the operation of applying predicate p on the view of A ⊳ ⊲ B ⊳ ⊲ C (according to the last rule), and subexpression $(AB_{p_1})C_{p_2}$ denotes a join of two views: $AB_{p_1}$ and $C_{p_2}$.

When queries have predicates, a subexpression with a predicate can reuse a view with the same or a weaker predicate, but not a view with a stronger predicate. There are three naive adaptations of method ManagedRisk for handling predicates: (1) method Same, i.e., use the same way as before to calculate regrets of subexpressions and choose query plans. If a query contains but does not use a subexpression, it will only contribute to the regret of the subexpression with the exact same predicate; (2) method Weaker: if a query contains but does not use a subexpression, it contributes to the regrets of subexpressions with the same or weaker predicates; (3) method Stronger: the opposite of Weaker, i.e., if a query contains but does not use a subexpression, it contributes to the regrets of subexpressions with the same or stronger predicates.

Examples that illustrate these methods are provided in Appendix F. These examples show that none of these three methods is competitive. Next, we show how to extend method ManagedRisk to obtain a competitive method for the general VQP problem. The main idea is that when a subexpression s with a predicate occurs, subexpressions with weaker predicates get the same regret as s, and subexpressions with stronger predicates get a fraction of the regret of s.

We first introduce several necessary concepts for Adaptation of Method ManagedRisk.

Cognate Subexpressions: Two subexpressions s and s' are cognate, if the views produced by s and s' are joins of the same set of tables (possibly with different predicates).

For example, subexpressions $A(BC_{c<5})$ and $A_{a>10}(BC)$ are cognate, because they are both joins of A and BC, although with different predicates.

Dominance: A subexpression s dominates a subexpression s' wrt query $Q_j$, denoted as $s_j s'$, i, if and only if: s and s' are cognate; s is contained in a query $Q'Q_i$ and s is contained in a query $Q''Q_i$; and the predicate in s is weaker than the predicate in s'.

s directly dominates s' wrt $Q_j$, denoted as $s_j s'$, if and only if: $s_j s'$, and there does not exist a subexpression s'', such that $s_j s''$ and $s''_j s'$.

$s_j s'$ represents that s=s', or $s_j s'$.

When $Q_j$ is clear from the context, we omit the subscript, and use s s', s s' and s s'.

Dominance Graph: For a sequence of queries $Q_1$, $Q_2$, ..., the dominance graph wrt query $Q_i$ is a DAG $G_i(V_i, A_i)$. Vertices of $G_i$ has a 1-1 mapping to all subexpressions contained in queries $Q_1:Q_i$ whose results are not available when $Q_i$ is processed. There is an arc from node u to v if the subexpression corresponding to u directly dominates that corresponding to v wrt $Q_i$.

Let PATH (u,v,G) be the set of nodes on all directed paths from u to v in DAG G (including u but excluding v). Based on Definition 4.2, we define the normalization factor as follows.

[Normalization Factor] Consider a query $Q_i$, its dominance graph $G_i$, and two nodes u and v in $G_i$ whose corresponding subexpressions are s' and s, where there is a directed path from u to v (i.e., s' s). The normalization factor of s wrt s' and $Q_i$, denoted as norm(s, s', $Q_i$) or norm(s, s',i), or simply norm(s, s') if the query is clear from the context, is defined as:

$$\text{norm}(s, s', Q_i) = \sum_{p \in PATH(u,v,G_i)} \prod_{w \in P, w \in p} (deg_o(w) + 1) \qquad (5)$$

where $deg_o(w)$ is the outdegree of w.

Next we introduce the new definition of regret for the general VQP problem. The explanation is given after the definition.

Regret, Last Regret for VQP: The regret of a subexpression s wrt query $Q_i$ is recursively defined as $$rg_i(s) = \sum_{Q_j | j < i, s' \triangleleft Q_j, s' s} \frac{C[P_j] - \sum_{s''' \in P_j} rg_j(s''')}{\text{norm}(s', s, Q_i)} + \sum_{Q_j | j < i, s'' \triangleleft Q_j, s s''} \left( C[P_j] - \sum_{s''' \in P_j} rg_j(s''') \right) - \sum_{s'' | s s''} lrg_i(s'') \qquad (6)$$

where $lrg_i(s)$ (also referred to as $lrg_{Q_i}(s)$) is the Last Regret of s wrt $Q_i$, defined as $$lrg_i(s) = \begin{cases} rg_Q(s), \text{ s.t. } Q < Q_i, \ s \in P(Q) \text{ and } rg_Q(s) > 0 \\ \text{if } Q \text{ exists} \\ 0, \text{ otherwise} \end{cases} \qquad (7)$$

Also, define lrg(s) as: if s or a subexpression that dominates s is used for the first time in query $Q_i$, then lrg(s)= $lrg_i(s)$; otherwise lrg(s)=0.

The last regret of s is the regret of s wrt the first query that uses s in the plan, if such a query exists. It is called "last regret" because it is the last query where the regret of s is non-zero. After s is used, rg(s) will be 0.

With the presence of predicates, there are three differences of the definition of regret. First, for each query that contains a subexpression s' s, its contribution to the regret of a subexpression s is divided by the normalization factor, norm(s, s',$Q_i$). This ensures that if a s' s and s' is contained in a query, then s only gets a fraction of the regret of s'. Second, for each query that contains a subexpression s'', s s'', this query contributes to the regret of s. Third, if s'' is a descendant of s and s" has already been used, then the last regret of s" (i.e., $lrg_t(s'')$) should be subtracted from the regret of s.

Note that when there's no predicate, Eq. (6) is equivalent as Eq. (1).

Now we are ready to introduce the new method ManagedRisk for the general VQP problem. It has two differences with the previous method ManagedRisk for join-only queries:

1. It uses Eq. (6) to compute regrets for subexpressions.
2. When it enumerates query plans, it also consider using dominating subexpressions that have occurred before. For example, for query $Q=(A,B,C_p)$, i.e., join of tables A, B and C with a predicate on table C, if a subexpression $BC_{p'}$ is contained in a previous query, and p' is weaker than p, then ManagedRisk will consider a plan of Q that materializes $BC_{p'}$.

Next we analyze the competitiveness of ManagedRisk for the VQP problem.

We first prove that the total regret of all subexpressions are bounded, similar as Lemma 3.4. The proof idea is similar, and the proofs have much overlap, although the proof of Lemma 4.3 has several additional key steps that establish the additional factor of ln N. Due to space constraint, the proof of Lemma 4.3 is presented in Appendix G.

Given a query sequence S, the plans generated by ON and OFF satisfy $$\sum_{Q \in S} rg(P_N(Q)) \leq (2^m - m - 1) \ln N \cdot \text{cost(OFF)}$$

where m is the maximum number of joins in a query plan and N is the number of queries in the sequence.

For the purpose of the following proofs, we need to modify the definition of Damage as well as a few notations previously used in Section 3. The new definition of damage of a late subexpression s includes the cost differences between ON and OFF not only for queries that contain s, but also for queries that contain subexpressions dominated by s. To that end, we modify notation $dif_s$, which now refers to all queries where OFF uses s or a subexpression s' dominated by s, but ON has not used s or s'. $ldif_s$ still refers to the last query in $dif_s$. The total ordering of all subexpressions is similar as before, except that if s s' and $ldif_s=ldif_{s'}$, then s<s'. $f_n(Q)$, $f_y(Q)$ and $fst_s$ are the same as in Section 3.

With these modifications, the formal definition for Damage does not need to be rewritten, i.e., it is written the same way as Definition 3.4. Note that if a query contains a subexpression s, then it also contains a subexpression s' if s' s. And since s'<s (according to the modified definition of total order above), the damages of both subexpressions are counted in $dm_s^{(1)}$, rather than $dm_{s'}^{(1)}$ (unless there exists s" s' which is also late).

Given a query sequence and the query plans generated by ON and OFF, the total damage of all subexpressions in the plans satisfies $$\sum_s dm_s \geq \text{cost(ON)} - \text{cost(OFF)} \quad (8)$$

The competitive ratio of method ManagedRisk is $(2^m-m-1)$ ln N+2 for the general VQP problem. Let s be a late subexpression, and let $Q_j=ldif_s$. That is, $Q_j$ is the last query where OFF uses a subexpression s', s s', but ON does not use s' in or before $Q_j$. If s≠s', make a change to $P_F(Q_j)$ such that OFF uses s instead of s'. OFF still pays the same cost since has already been used by OFF, and can be reused. Let $P_{F'}(Q_j)$ be the revised plan. Since ON chooses $P_N(Q_j)$ over $P_{F'}(Q_j)$, we have $$\text{score}(P_N(Q_j)) \geq \text{score}(P_{F'}(Q_j))$$

$$rg_j(P_{F'}(Q_j)) - C_N(P_{F'}(Q_j)) \leq rg_j(P_N(Q_j)) - C_N(P_N(Q_j))$$

$$rg_j(P_{F'}(Q_j)) + C_N(P_N(Q_j)) - rg_j(P_N(Q_j)) \leq C_N(P_{F'}(Q_j)) \quad (9)$$

Since $P_{F'}(Q_j)$ contains s, we have $$rg_j(P_{F'}(Q_j)) \geq rg_j(s) \geq \sum_{Q|Q \in dif_s, Q_j} (C_N(Q) - rg(P_N(Q)))$$

Thus $$rg_j(P_{F'}(Q_j)) + C_N(P_N(Q_j)) - rg_j(P_N(Q_j)) \geq \quad (10)$$
$$\sum_{Q|Q \in dif_s, s=f_n(Q)} (C_N(Q) - rg(P_N(Q))) \geq$$
$$dm_s^{(1)} + \sum_{Q|Q \in dif_s, s=f_n(Q)} (C_F(Q) - rg(P_N(Q)))$$

From Eq. (9) and (10):

$$dm_s^{(1)} \leq C_N(P_{F'}(Q_j)) + \sum_{Q \in dif_s} rg(P_N(Q))$$

The cost of $P_{F'}(Q_j)$ is part of cost(OFF). For each subexpression $s' \in P_{F'}(Q_j)$, we can prove in a similar way as the corresponding part in the proof of Theorem 3.4, that if it has been used by OFF but not by ON, then its cost is only used to match the $dm_s^{(1)}$, and will not be used to match $dm^{(1)}$ of any other subexpressions:

- if ON and OFF both use s' for the first time in $Q_j$, then they both pay c(s') in $Q_j$; if ON and OFF have both used s' before, they both do not pay for s' in $Q_j$.
- if ON has used s' before $Q_j$ but OFF hasn't, then ON pays zero but OFF pays c(s') in $Q_j$;
- if OFF has used s' before $Q_j$ but ON hasn't, since the subexpressions are sorted by decreasing order of ldif, and $s=f(Q_j)$, $ldif_{s'} \leq ldif_s$, which means $Q_j$ is also the last query in $dif_{s'}$. This means that c(s') is not counted in $dm_{s''}^{(1)}$ of any other subexpression s".

Therefore, $$dm_s^{(1)} \leq \sum_{Q \in dif_s, s=f_n(Q)} rg(P_N(Q)) \quad (11)$$

For $dm^{(2)}$, for each s, $C_N(fst_s)-C_F(fst_s)$ comprises the costs of those subexpressions in $f_y(fst_s)$, i.e., those subexpressions that have been used by OFF before $fst_s$, and that are used by ON for the first time in $fst_s$. Thus for each subexpression $s' \in P_N(fst(s))$, ON and OFF both pays for c(s'). Thus $$\sum_s dm_s^{(2)} \leq \text{cost}(\text{OFF}) \tag{12}$$

From Eq. (11) and (12), and the fact that for any two subexpressions s and s', sets $\{Q|Q \in \text{dif}_s, s=f_n(Q)\}$ and $\{Q|Q \in \text{dif}_{s'}, s'=f_n(Q)\}$ do not overlap, we have $$\begin{aligned}\sum_s dm_s &= \sum_s dm_s^{(1)} + \sum_s dm_s^{(2)} \\ &\leq \sum_{Q \in \text{dif}_s, s=f_n(Q)} rg(P_N(Q)) + \text{cost}(\text{OFF}) \\ &\leq \sum_{Q \in S} rg(P_N(Q)) + \text{cost}(\text{OFF}) \\ &\leq (2^m - m - 1) \ln N \cdot \text{cost}(\text{OFF}) + \text{cost}(\text{OFF})\end{aligned}$$

Besides using opportunistic views, a big data platform that processes analytical workloads may also benefit from proactively building views. If we anticipate that there will likely be future queries that will benefit from a view v, we may build this view proactively when the system is idle, rather than waiting till we actually receive a query that needs to use v.

Which views to build proactively, and when to build them, are out of the scope of this paper. It can either be decided manually be a system administrator, or automatically using some heuristics, such as looking at which views are useful for a window of recent queries [10, 6]. In this subsection we discuss that, if views are proactively built during the process of the query sequence, how it will affect the competitiveness of method ManagedRisk.

We assume that given a certain query sequence, the proactive views to be built are fixed, i.e., it does not depend on the method for processing the query sequence. Each proactive view can be represented as (v, i), which means that view v is built after query $Q_i$ is processed (hence v can be reused by queries later than $Q_i$). An online method does not know what views will be proactively created in the future and when will they be created, just like it doesn't know what queries it will see in the future. On the other hand, an optimal offline method knows all queries and proactive views in advance.

The following theorem shows that there is no need to handle proactively views in a special way. We can run method ManagedRisk and treats each proactive view as a normal query (except that there is only one possible plan for such queries), and the competitive ratio is still valid. The competitive ratio of method ManagedRisk is $(2^m-m-1)$ ln N+2 when there are proactive views.

As a starting point we discuss a special case of the VQP problem (referred to as VQP-SP), where each query is join-only (no predicates, projections or group-bys). We show that two baseline methods, method Greedy and method Normalize, are not competitive even if each query has at most two joins. We prove that for VQP-SP (and thus for VQP as well), any competitive method must have a competitive ratio which is a function of m, where m is the maximum number of joins in a query in the sequence. If m is unlimited, there does not exist an online method with a non-trivial competitive ratio. For the VQP-SP problem we develop an method named ManagedRisk, analyze its competitiveness and prove that it has a competitive ratio of $2^m-m+1$. Note that the competitive ratio is independent of the number of queries in the workload. We then study the general VQP problem where each query is SPJGA. When there are predicates, projections and group-bys in the query, an opportunistic view v is useful for a query Q only if v's predicate, projection and group-by is equal to or weaker than Q's predicate, projection and group-by. We extend method ManagedRisk for the general VQP problem, and prove that it has a competitive ratio of $(2^m-m-1)$ ln N+2 where N is the number of queries in the sequence. In the end we discuss the case where there are views proactively built during the query sequence, and prove that the presence of proactively built views does not change the competitive ratio of Method ManagedRisk.

This system performs visionary query processing on big data analytics platforms. Hadoop and similar systems usually materialize intermediate results of a query plan for fault tolerance, and they can be reused to speed up future queries. Given a sequence of SPJGA queries, we tackle the online optimization problem of how to choose a query plan for each query, such that the total cost of all query plans is minimized. To do so, each query should not simply use the currently cheapest plan (doing so is uncompetitive even for very simple instances of the problem), but should consider whether a plan will produce useful opportunistic views that may benefit future queries. We present Method ManagedRisk, which has a competitive ratio of $2^m-m+1$ when queries are join-only, and a competitive ratio of $(2^m-m-1)$ln N+2 when queries are SPJGA, where m is the maximum number of joins involved in a query, and N is the number of queries in the sequence.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for query processing in a big data analytics platform, comprising:
    enumerating plans for a current query using a processor;
    building a dominance graph for the current query;
    for each plan, determining a regret value and a score for the plan based on the regret value and cost; and selecting query plans in an online fashion for query processing in big data analytics platforms where intermediate results are materialized and can be reused later;

wherein for each plan $P_{ij}$, using a scoring function score ($P_{ij}$) defined as $$score(P_{ij}) = \sum_{s \in P_{ij}} rg_i(s) - C(P_{ij});$$

with $rg_i(s)$ representing a regret of s wrt the ith query, and $C(P_{ij})$ representing cost of plan $P_{ij}$.

2. The method of claim 1, comprising receiving as input previous queries, current query, and a cost model.

3. The method of claim 1, comprising processing each query without knowing future queries with a worst case performance guarantee.

4. The method of claim 1, comprising determining regret, wherein $Q_1, Q_2, \ldots$ is a sequence of join-only queries, $P_i$ denote the plan selected for $Q_i$ and for each query $Q_i$ and each subexpression $s \triangleleft Q_i$, the regret of s wrt $Q_i$, denoted by $rg_i(s)$ or $rg_{Q_i}(s)$, is recursively defined as: if the result of s is not produced in any $P_j(1 \leq j < i)$, $$rg_i(s) = \sum_{Q_j | j < i, s \triangleleft Q_j} \max\left\{C(P_j) - \sum_{s' \in P_j} rg_j(s'), 0\right\}$$

if the result of s is available for reuse when $Q_i$ is processed, i.e., it is produced in a query $Q_j(1 \leq j < i)$, $rg_i(s)=0$.

5. The method of claim 1, wherein a plan that contains high-regret subexpressions and has a low cost gets a high score, comprising choosing the plan for $Q_i$ with the maximum score among all plans for $Q_i$.

6. The method of claim 1, comprising determining damage.

7. The method of claim 6, with a sequence of queries S and the query plans generated by ON and OFF, the damage of a subexpression s, denoted as $dm_s$, is defined as:

if s is late, $dm_s = dm_s^{(1)} + dm_s^{(2)}$, where $$dm_s^{(1)} = \sum_{Q | Q \in dif_s, s = f_n(Q)} C_N(Q) - C_F(Q)$$

$$dm_s^{(2)} = \begin{cases} C_N(fst_s) - C_F(fst_s); \text{ if } fst_s \text{ exists} \\ \text{and } s = f_y(fst_s) \text{ and } f_n(fst_s) = \emptyset \\ 0; \text{ otherwise} \end{cases}$$

otherwise, $dm_s = 0$.

8. A method for query processing in a big data analytics platform, comprising:
   enumerating plans for a current query using a processor;
   building a dominance graph for the current query;
   for each plan, determining a regret value and a score for the plan based on the regret value and cost; and
   selecting query plans in an online fashion for query processing in big data analytics platforms where intermediate results are materialized and can be reused later,
   wherein for a sequence of queries $Q_1, Q_2, \ldots$, the dominance graph $G_j$ with respect to a query $Q_i$ is a directed acyclic graph (DAG) with $G_i(V_i, A_i)$ with $V_i$ and $A_i$ being mapping points in the dominance graph $G_j$,
   wherein vertices of $G_i$ has a 1-1 mapping to all subexpressions contained in queries $Q_1: Q_i$ whose results are not available when query $Q_i$ is processed and an arc from node u to node v if the subexpression corresponding to u directly dominates that corresponding to v with respect to $Q_i$.

9. The method of claim 1, comprising determining regret of a subexpression s for query $Q_i$ recursively as $$rg_i(s) = \sum_{Q_j | j < i, s' \triangleleft Q_j, s' \square s} \frac{C[P_j] - \sum_{s''' \in P_j} rg_j(s''')}{\text{norm}(s', s, Q_i)} +$$

$$\sum_{Q_j | j < i, s'' \triangleleft Q_j, s''} \left(C[P_j] - \sum_{s''' \in P_j} rg_j(s''')\right) - \sum_{s'' | s \square s''} lrg_i(s'')$$

where $lrg_i(s)$ (also referred to as $lrg_{Q_i}(s)$) is the Last Regret of s for $Q_i$, defined as $$lrg_i(s) = \begin{cases} rg_Q(s), \text{ s.t. } Q \prec Q_i, s \in P(Q) \text{ and } rg_Q(s) > 0 \\ \text{if } Q \text{ exists} \\ 0, \text{ otherwise} \end{cases}.$$

10. A system for query processing in a big data analytics platform, comprising:
   a processor;
   code executed by the processor for:
   enumerating plans for a current query using a processor;
   building a dominance graph for the current query;
   for each plan, determining a regret value and a score for the plan based on the regret value and cost; and
   selecting query plans in an online fashion for query processing in big data analytics platforms where intermediate results are materialized and can be reused later;
   comprising code for determining regret, wherein $Q_1, Q_2, \ldots$ is a sequence of join-only queries, $P_i$ denote the respective plan selected for $Q_i$ and for each query $Q_i$ and each subexpression $s \triangleleft Q_i$, the regret $rg_i(s)$ of subexpression s wrt $Q_i$, denoted by $rg_i(s)$ or $rg_{Q_i}(s)$, is recursively defined as: if the result of subexpression s is not produced in any plan $P_j(1 \leq j < i)$, $$rg_i(s) = \sum_{Q_j | j < i, s \triangleleft Q_j} \max\left\{C(P_j) - \sum_{s' \in P_j} rg_j(s'), 0\right\}.$$

if the result of subexpression s is available for reuse when $Q_i$ is processed, i.e., it is produced in a query $Q_j(1 \leq j < i)$, $rg_i(s)=0$;
with $C(P_j)$ representing cost of plan $P_j$, and $rg_j(s'),0$ in the equation representing the total regret of subexpressions used in each plan $P_j$.

11. The system of claim 10, comprising code for receiving as input previous queries, current query, and a cost model.

12. The system of claim 10, comprising code for processing each query without knowing future queries with a worst case performance guarantee.

13. The system of claim 10, comprising code for determining regret of a subexpression s for query $Q_i$ recursively as $$rg_i(s) = \sum_{Q_j | j < i, s' \lhd Q_j, s' \sqsubseteq s} \frac{C[P_j] - \sum_{s''' \in P_j} rg_j(s''')}{\text{norm}(s', s, Q_i)} +$$

$$\sum_{Q_j | j < i, s'' \lhd Q_j, s \sqsubseteq s''} \left( C[P_j] - \sum_{s''' \in P_j} rg_j(s''') \right) - \sum_{s'' | s \sqsubseteq s''} lrg_i(s'')$$

where $lrg_i(s)$ (also referred to as $lrg_{Q_i}(s)$) is the Last Regret of s for $Q_i$, defined as $$lrg_i(s) = \begin{cases} rg_Q(s), \text{ s.t. } Q \prec Q_i, s \in P(Q) \text{ and } rg_Q(s) > 0 \\ \text{if } Q \text{ exists} \\ 0, \text{ otherwise} \end{cases}.$$

* * * * *